US010836539B1

(12) United States Patent
Cousins et al.

(10) Patent No.: US 10,836,539 B1
(45) Date of Patent: Nov. 17, 2020

(54) SELECTABLE VOLUME PRECISION LIQUID DISPENSER

(71) Applicant: The Boeing Company, Chicago, IL (US)

(72) Inventors: Clifford G. Cousins, Cypress, CA (US); Mitesh Patel, Frisco, TX (US)

(73) Assignee: THE BOEING COMPANY, Chicago, IL (US)

( * ) Notice: Subject to any disclaimer, the term of this patent is extended or adjusted under 35 U.S.C. 154(b) by 21 days.

(21) Appl. No.: 16/405,253

(22) Filed: May 7, 2019

(51) Int. Cl.
| | |
|---|---|
| *B65D 35/02* | (2006.01) |
| *B65D 35/40* | (2006.01) |
| *B65D 35/22* | (2006.01) |
| *B65D 35/28* | (2006.01) |
| *B65D 35/44* | (2006.01) |
| *G01F 11/08* | (2006.01) |
| *G01F 11/12* | (2006.01) |

(52) U.S. Cl.
CPC ............ *B65D 35/22* (2013.01); *B65D 35/02* (2013.01); *B65D 35/28* (2013.01); *B65D 35/44* (2013.01); *G01F 11/082* (2013.01); *G01F 11/12* (2013.01); *B65D 2203/02* (2013.01)

(58) Field of Classification Search
CPC ........ B65D 35/02; B65D 35/22; B65D 35/28; B65D 35/44; B65D 35/40; B65D 2203/02; G01F 11/12; G01F 11/082
USPC ....... 222/92–107, 206–215, 464.2, 630–633, 222/158, 132
See application file for complete search history.

(56) References Cited

U.S. PATENT DOCUMENTS

| | | | | |
|---|---|---|---|---|
| 3,347,420 A | * | 10/1967 | Donoghue | G01F 11/286 222/129 |
| 3,518,018 A | * | 6/1970 | Woods | D06B 11/0056 401/46 |
| 5,127,553 A | * | 7/1992 | Weinstein | G01F 11/288 222/158 |
| 5,186,366 A | * | 2/1993 | Meisner | A47G 19/34 222/158 |
| 5,298,025 A | * | 3/1994 | Hessel | A61M 5/152 128/DIG. 12 |
| 5,303,851 A | * | 4/1994 | Libit | B05B 11/303 222/207 |
| 5,372,487 A | * | 12/1994 | Pekar | F04B 33/00 137/512.15 |
| 5,573,143 A | | 11/1996 | Deardurff et al. | |
| 6,416,496 B1 | * | 7/2002 | Rogers | A61M 5/148 604/132 |

(Continued)

*Primary Examiner* — Paul R Durand
*Assistant Examiner* — Andrew P Bainbridge
(74) *Attorney, Agent, or Firm* — Coats & Bennett, PLLC

(57) ABSTRACT

A selectable volume precision liquid dispenser apparatus and method of use. The dispenser apparatus includes a graduated, segmented elastic body with an interior space having different regions corresponding to different volumes where different liquid containing chambers are separated by one-way valves. Pressure applied by a user to one of the different chambers causes the dispensing of a precise amount of liquid through an inner conducting tube having openings to receive liquid in each of the different regions, and an outlet for dispensed the liquid. Release of the pressure allows the elastic body to return towards its original (resting) shape and draw liquid from a reservoir into the previously dispensed region in preparation for the next dispensing operation.

20 Claims, 6 Drawing Sheets

(56) References Cited

U.S. PATENT DOCUMENTS

| | | | | |
|---|---|---|---|---|
| 6,629,799 | B2* | 10/2003 | Flores, Jr. | A47K 5/1202 |
| | | | | 15/104.92 |
| 7,118,012 | B2 | 10/2006 | Butler | |
| 8,057,733 | B2 | 11/2011 | Begley et al. | |
| 8,136,700 | B2* | 3/2012 | LaFlamme | B65D 81/3261 |
| | | | | 222/135 |
| 8,267,282 | B2* | 9/2012 | Pai | A61M 3/0262 |
| | | | | 222/158 |
| 8,292,120 | B2* | 10/2012 | LaFlamme | B05B 11/3032 |
| | | | | 222/94 |
| 8,991,659 | B2* | 3/2015 | Dey | B65D 21/0201 |
| | | | | 222/132 |
| 2006/0108379 | A1* | 5/2006 | Glynn | G01F 11/288 |
| | | | | 222/211 |
| 2006/0255068 | A1* | 11/2006 | Genosar | B65D 75/5883 |
| | | | | 222/207 |
| 2007/0205224 | A1* | 9/2007 | Glynn | G01F 11/288 |
| | | | | 222/211 |
| 2014/0252033 | A1* | 9/2014 | Murray | B05B 11/3033 |
| | | | | 222/107 |
| 2016/0176584 | A1* | 6/2016 | Ishihara | B65D 35/02 |
| | | | | 493/243 |
| 2018/0022526 | A1* | 1/2018 | Demarest | A61C 19/066 |
| | | | | 433/90 |

* cited by examiner

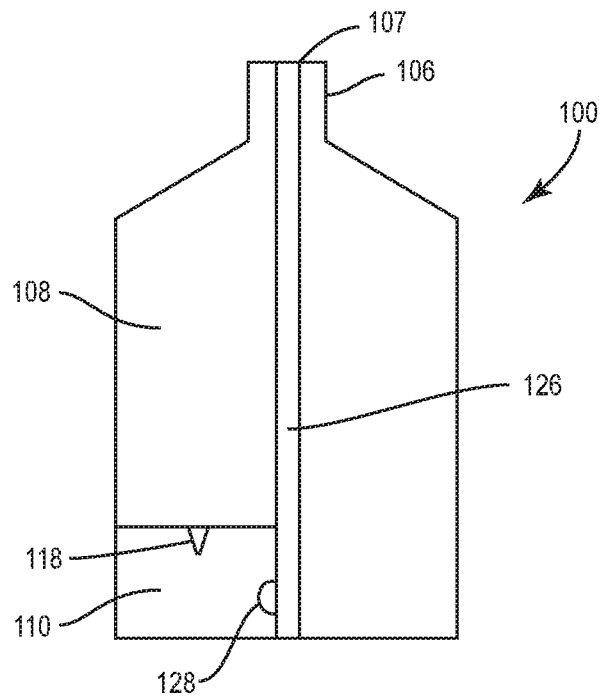
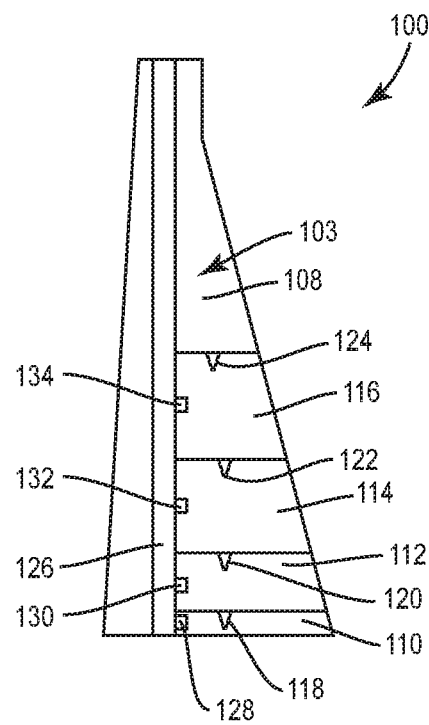
FIG. 7   FIG. 8
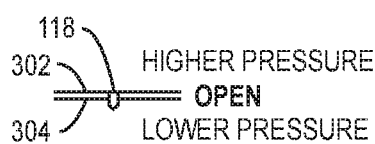
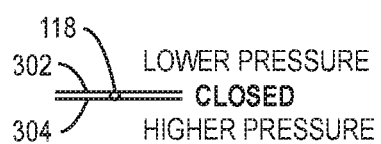
FIG. 9A   FIG. 9B
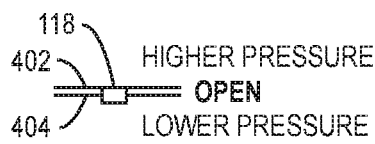
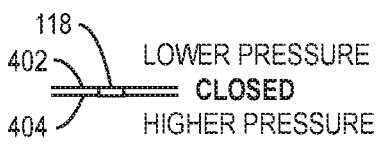
FIG. 10A   FIG. 10B

SELECTABLE VOLUME PRECISION LIQUID DISPENSER

TECHNOLOGICAL FIELD

The present disclosure relates generally to the field of liquid dispensers and, more specifically, to liquid dispensers for dispensing predetermined amounts of liquid.

BACKGROUND

Liquid dispensers are used to dispense a variety of different liquids. Examples of liquids include but are not limited to industrial lubricants, glue, gels, paints, medicine, personal hygiene items such as toothpaste, and food such as condiments. The liquid dispensers basically include a body with an enclosed interior space to contain the liquid. An opening in the body allows for the liquid to be removed from the interior space and used for its intended purpose.

Some liquid dispensers are not able to dispense a specific amount of liquid. The interior space is a single chamber sized to contain a relatively large amount of liquid. In use, the liquid is poured or otherwise expelled from the interior space through the opening. It is often necessary to pour the liquid into a measuring device (e.g. a spoon or cup) to measure the liquid. The liquid in the measuring device is then delivered or applied as intended. This configuration is cumbersome as it requires a measuring device in addition to the liquid dispenser. Further, some of the liquid in the dispenser is wasted as it adheres to the measuring device and is not delivered for use. The liquid may also be spilled during the transfer process from the liquid dispenser to the measuring device.

Some liquid dispensers, such as eyedroppers, are able to dispense liquids one drop at a time using a delicate touch. Other liquid dispensers are able to dispense a fixed and larger amount of liquid. For example, some medicine containers are configured to dispense a single dose of liquid medicine. In use, the medicine container is opened and the liquid medicine is taken by the user. However, these medicine dispensers only dispense a fixed amount of liquid. These medicine dispensers are not configured to contain or deliver multiple or precisely selectable doses of the liquid medicine. Further, the liquid dispensers are often intended for a particular category, such as children, and contain the appropriate amount of liquid for that category.

SUMMARY

One aspect is directed to a liquid dispensing apparatus. The apparatus includes an elastic body to retain and discharge a liquid. The elastic body includes a port to discharge the liquid. An interior space is formed within the elastic body and includes a reservoir in serial communication with a plurality of chambers. A one-way valve is associated with each of the chambers to conduct the liquid into the associated chamber. An elongated conducting member is disposed within the interior space and terminates at the port. The elongated conducting member includes a plurality of openings with each opening corresponding to one of the plurality of chambers. Compressing a selected portion of the elastic body corresponding to a particular one of the chambers causes an increase in pressure within the selected chamber to close the corresponding one-way valve of the selected chamber forcing a predetermined volume of the liquid from the selected chamber into the corresponding opening of the elongated conducting member and discharging the predetermined volume of liquid from the particular one of the chambers through the port.

One aspect is directed to a liquid dispensing apparatus. The apparatus includes an elastic body to retain and discharge a liquid. The elastic body comprises an interior space and a port in communication with the interior space. An elongated conducting member is disposed within the interior space and configured to deliver the liquid to the port. The elongated conducting member includes spaced-apart openings that are spaced away from the port. One or more chambers are positioned within the interior space with each of the one or more chambers being aligned with a different one of the openings in the elongated conducting member and include an enclosed area to contain a predetermined amount of the liquid and a one-way valve to conduct the liquid into each of the one or more chambers. Each of the one or more chambers is configured to be compressed to expel the liquid in the chamber into the elongated conducting member for delivery from the elastic body through the port.

One aspect is directed to a method of dispensing a liquid from an apparatus. The method includes: compressing a selected portion of an elastic body corresponding to a chamber and thereby increasing a pressure within the chamber; closing a one-way valve in the chamber in response to increasing the pressure in the chamber with the one-way value fluidly connecting the chamber to a reservoir; forcing a predetermined volume of the liquid from the chamber and into an elongated conducting member and moving the liquid along the elongated conducting member and discharging the predetermined volume of liquid from a port in the elastic body; releasing the selected portion of the elastic body thereby decreasing the pressure within the chamber; and moving the liquid from the reservoir through the one-way valve and refilling the liquid in the chamber in response to decreasing the pressure.

BRIEF DESCRIPTION OF THE DRAWINGS

FIG. 7 is a schematic section view of a selectable volume precision liquid dispensing apparatus in accordance with an example.

FIG. 8 is a schematic section view of a selectable volume precision liquid dispensing apparatus in accordance with an example.

FIGS. 9A and 9B are schematic diagrams of a first type of valve in open and closed configurations in accordance with an example.

FIGS. 10A and 10B are schematic diagrams of a second type of valve in open and closed configurations in accordance with an example.

DETAILED DESCRIPTION

The present application is directed to a selectable volume precision liquid dispenser apparatus and method for use. The dispenser apparatus includes a graduated, segmented elastic body with an interior space having different regions corresponding to different volumes where different liquid containing chambers are separated by one-way valves. Pressure applied by a user to one of the different chambers causes the dispensing of a precise amount of liquid through an inner conducting tube having openings to receive liquid in each of the different regions, and an outlet for dispensed the liquid. Release of the pressure allows the elastic body to return towards its original (resting) shape and draw liquid from a reservoir into the previously dispensed region in preparation for the next dispensing operation. Liquids may include oil, lubricant, glue, gel, paint, and other viscous fluids. Typically, such liquids will be uniform in density and consistency, not containing material that may clog or impede liquid flow through the one-way valves when they are open or may prevent proper closing of the one-way valves as described more fully below.

Figure 1:
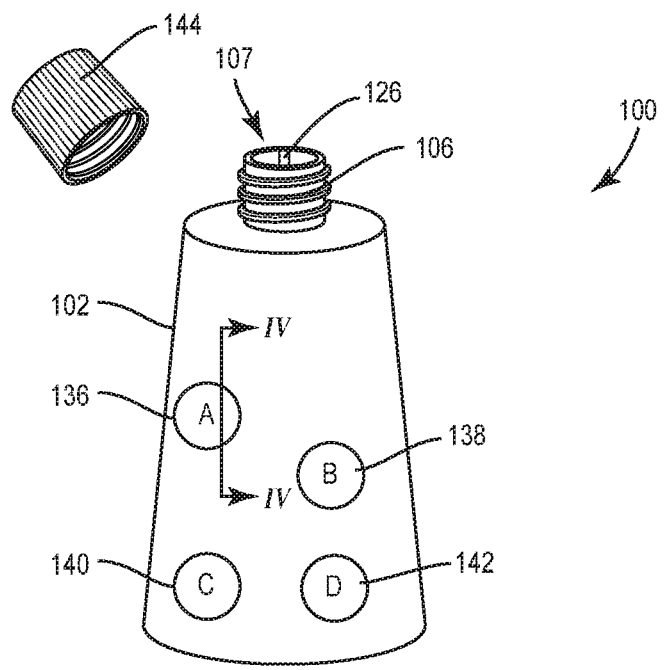
FIG. 1 is a perspective view of a selectable volume precision liquid dispenser apparatus in accordance with an example.

FIG. 1 illustrates a dispensing apparatus 100 that includes an elastic body 102 that extends around an interior space to contain a liquid. A port 107 provides for delivering the liquid from the elastic body 102 and refilling the liquid. A cap 144 is removably connected to the elastic body 102 and sized and configured to extend over the port 107. Labels 136, 138, 140, 142 are positioned on the exterior of the elastic body 102. The labels 136, 138, 140, 142 are aligned with corresponding chambers (not illustrated) within the interior space. Each chamber holds a predetermined amount of liquid. The labels 136, 138, 140, 142 can include indicia indicating the amount of liquid in the corresponding chamber. The user can apply pressure to the elastic body 102 at a selected label corresponding to the amount of desired liquid. For example, a user can place a thumb on a selected label while a finger is placed behind the selected label on a position opposite the label on body 102, and a squeezing motion is provided to increase pressure within the particular chamber associated with the selected label. The pressure applied by the user causes the elastic body 102 to compress and force the liquid in the selected chamber to be expelled through the port 107 for use by the user.

Figure 2:
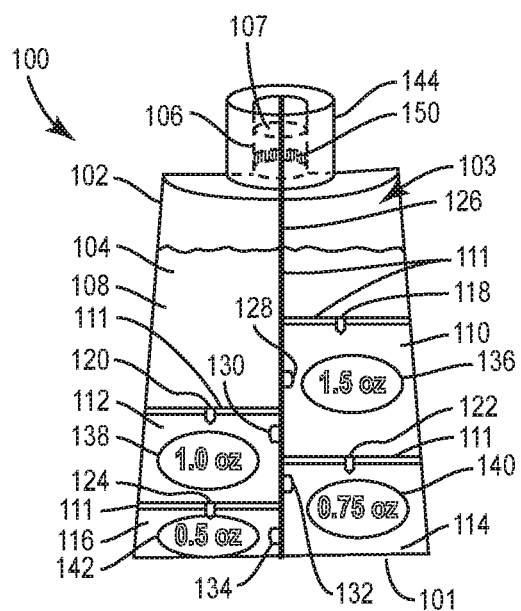
FIG. 2 is a schematic section view of a selectable volume precision liquid dispenser apparatus in accordance with an example.

FIG. 2 discloses an example of a selectable volume precision liquid dispenser apparatus 100. The interior space 103 within the elastic body 102 is visible in this schematic view. The liquid dispensing apparatus 100 includes the elastic body 102 for retaining and dispensing (e.g. discharging) the liquid 104. The enclosed interior space 103 is formed within the elastic body 102 to contain the liquid 104 where a reservoir and a plurality of chambers are separated by partitions 111, as shown. The partitions 111 may be formed during manufacture of body 102 and the valve inserted in a bottom up fashion. Alternatively, the partitions 111 may be formed as a lattice or pre-formed structure that is inserted within body 102 during manufacture. The elastic body 102 further includes a neck portion 106 that is in communication with the interior space 103. Liquid 104 entering into or being expelled from the interior space 103 moves through the neck portion 106 and the port 107. A region adjacent to (e.g. shown as above) the liquid 104 can contain mostly air or could be a gas that is inert or non-reactive in relation to the type of liquid 104. The neck portion 106 can initially receive the liquid 104 and fill up the dispensing apparatus 100. The removable cap 144 provides for closing or sealing the neck portion 106 and port 107 when not in operation.

The interior space 103 includes a reservoir 108 that is in serial communication with a plurality of chambers 110-116 each having a predetermined volume. The size of the reservoir 108 can vary. In one example, the reservoir 108 includes a greater size to hold more liquid 104 than any of the chambers 110-116. Each chamber 110-116 has a pressure activated, one-way valve 118-124 on a dividing partition 111 disposed between the associated chamber and the neck portion 106, the one-way valve for conducting the liquid 104 into the associated chamber 110-116 and preventing reverse liquid flow when the associated chamber is pressurized. The liquid dispensing apparatus 100 can also include an elongated conducting member 126 (e.g. a tube member) that is located within the interior space 103 with one end of the conducting member 126 terminating at the neck portion 106. Conducting member 126 can also include a partition 111 for surrounding the conducting member and laterally separating chambers that are substantially side-by-side. The elongated conducting member 126 may be constructed of suitable plastic or metal material. The conducting member 126 has a plurality of openings 128-134 where each opening corresponds to one of the plurality of chambers 110-116. A retaining member 150 may be used to secure an end portion of conducting member 126 to a side-wall of neck portion 106 to permit liquid filling when dispensing apparatus 100 is not in operation.

In operation, compressing a label 136-142 of the elastic body 102 corresponding to a particular chamber 110-116 causes an increase in pressure within the selected chamber 110-116. The pressure closes the corresponding one-way valve 118-124 (e.g. filling valve) of the selected chamber 110-116 forcing a predetermined volume of the liquid 104 from the selected chamber 110-116 into the corresponding opening of the elongated conducting member 126 for that particular chamber and discharging the predetermined volume of liquid from the elastic body 102 through the conducting member 126 based on the size of the selected chamber. Subsequent to the pressing (e.g. compressing) operation, and upon releasing compression of the selected portion, the elastic body 102 causes the previously selected portion 136-142 (e.g. chamber) to expand and refill with liquid 104. The liquid 104 that refills the selected chamber 110-116 can come from the reservoir 108 and/or an adjacent chamber 110-116 through the associated one-way valve 118-124 and depending on the relative position of the discharged chamber 110-116.

The chambers 110-116 can each be identified by a label 136-142 where each label depicts the volume of the associated chamber, or some other marking. The labels 136-142 can provide a visual identification of the respective chamber 110-116. The labels may conform to the surface of body 102 (e.g. flush with the body surface) or they may be raised to provide more precise application of pressure to the associated chamber, as will be described more fully below. The configurations (e.g. location or position) of the various chambers and corresponding labels can vary. The labels 136-142 can be located at various positions on the exterior of the elastic body 102 corresponding to substantially the center of the associated chamber, as will be described more fully below. FIG. 1 illustrates a dispensing apparatus 100 with labels 136-142 each with different indicia to distinguish the different chambers 110-116 and different amounts of liquid 104 disposed in a first configuration. FIG. 2 includes a dispensing apparatus 100 with the labels 136-142 having the corresponding chamber volume disposed in a second configuration. Shape and/or sizing can also be used to differentiate the labels 136-142 and corresponding chambers 110-116. FIG. 2 illustrates a slight taper in the body 102. In one example, a narrow profile proximal to neck portion 106 and a wider profile distal to the neck portion 106 may be due to manufacturing where body 102 has a tube shape prior to sealing. If the chamber separating partitions are formed by or with a lattice member, the lattice member can be inserted from an open end of a tube prior to sealing the tube by crimping, heat-sealing, or both.

Figure 3:
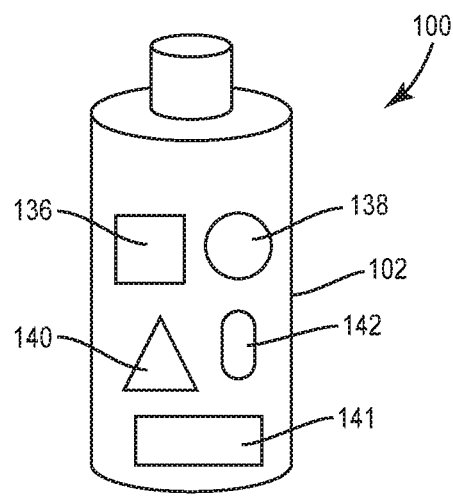
FIG. 3 is a perspective view of a selectable volume precision liquid dispenser apparatus in accordance with an example.

FIG. 3 includes an example of a dispensing apparatus 100 with each of the labels 136-142 having a different shape to differentiate the different chambers 110-116 and liquid amounts. Sizing of the labels can also be used to distinguish the different labels 136-142 and their associated dispensing volumes. Smaller chambers within the chambers 110-116 can include physically smaller labels with larger chambers having physically larger labels, or the labels can be roughly the same size for consistency and comfort of use. In an example, a centrally-disposed chamber at the distal end 101 of body 102 can be operated by compressing label 141. A pressure operated valve may be disposed along the corresponding partition divider and an end portion of conducting tube 126 may be disposed centrally within the associated chamber operated by label 141.

One or more of the labels 136-142 can also provide for tactile identification of the respective chamber 110-116. For example, the label 136 may include a raised shape or raised features of the shape that can be felt by the user. Similarly, the different labels 136-142 can include colors and different shapes to provide for different tactile and/or visual identification to distinguish the various chambers 110-116 and corresponding amounts of liquid 104. These tactile labels 136-142 can also provide feedback to the user when compressed. To ensure complete dispensing of the selected volume of liquid, it is important that the selected chamber (110-116) be completely compressed in a single operation. A user operating the dispensing apparatus 100 will determine when no further compression is possible for the selected chamber. Releasing and then re-compressing the selected label can cause the associated chamber to at least partially refill if the compressing operation is interrupted. The labels 136-142 can include a raised portion with a volume characteristic that may be felt by the user without visual inspection.

In the various examples, the labels 136-142 can be operated without a user looking at the apparatus 100. This could occur when the view of the dispensing site is obstructed, operating the dispenser in the dark, and for other reasons when "blind" dispensing operation is desired. For example, this can be beneficial when the other hand of the user is occupied with another task of holding or manipulating an item being serviced or manufactured.

Figure 4:
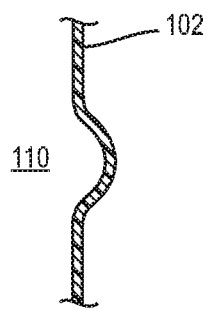
FIG. 4 is a section view of a chamber in a first orientation when full of a liquid in accordance with an example.
Figure 4A:
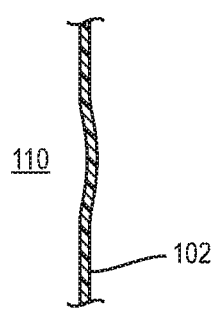
FIG. 4A is the chamber of FIG. 4 in a compressed configuration in accordance with an example.

FIG. 4 illustrates a schematic section view of a portion of chamber 110 formed within an interior of the elastic body 102 (drawing exaggerated for illustration, and associated chamber label is not shown). When the chamber 110 is filled with liquid 104, the elastic body 102 can extend outward forming a raise (e.g. concave) shape. This raised shape can be felt by the user and provide for tactile identification. To expel the liquid 104 from the chamber 110, the user compresses the elastic body 102 at the chamber 110 (e.g. right-to-left motion in the figure). This causes the elastic body 102 to move inward towards the interior of the dispensing apparatus 100 and force the liquid 104 out of the chamber 110. Notice, the body 102 portion corresponding to chamber 110 is not compressed in a convex manner (e.g. inverted shape) to ensure chamber 110 will refill in the same direction and avoid becoming stuck in a compressed position.

Figure 5:
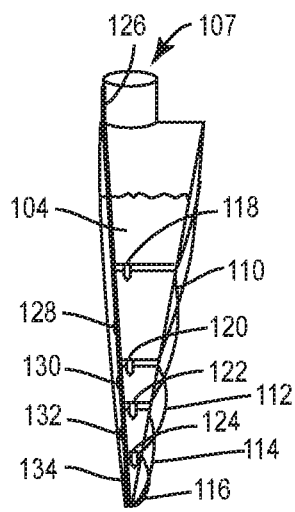
FIG. 5 is a schematic section view of the selectable volume precision liquid dispensing apparatus of FIG. 2 in accordance with an example.

FIG. 5 illustrates a schematic side section view of the dispensing apparatus 100 of FIG. 1, where identical reference numbers identify corresponding elements in FIG. 1. In one example, the dispensing apparatus 100 could be filled initially by inverting and compressing the chambers and reservoir portion of elastic body 102 while the neck portion 106 is submerged in a quantity of liquid 104. The elastic body 102 is released causing a return towards the original shape and thus pulling the liquid 104 into the interior space 103 through the neck portion 106. This liquid 104 would fill each of the chambers 110-116 and at least partially fill the reservoir 108. Some adjustments and minor manipulations may be needed to completely fill each chamber 110-116 prior to use. In this example, a semi-translucent body 102 may be inspected after filling to see if there are unfilled regions then refilled, if needed. Alternatively, a user could at least partially operate each of the chambers starting at the bottom (e.g. toward distal end 101) and working toward the top (e.g. toward neck portion 106) to ensure each chamber and the elongated member 126 is filled with liquid to ensure precision dispensing of liquid during operation.

Figure 6:
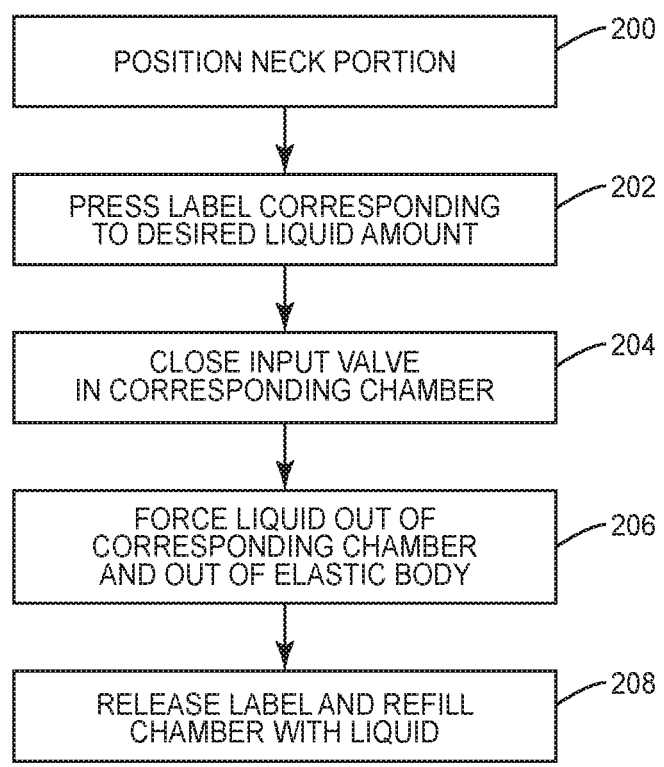
FIG. 6 is a flowchart diagram of a method of dispensing a liquid from a selectable volume precision liquid dispensing apparatus in accordance with an example.

Upon being filled, the dispensing apparatus 100 is ready for use. A method of using the dispensing apparatus 100 illustrated in FIG. 6. The dispensing apparatus 100 is positioned with the neck portion 106 located at a point where the liquid 104 is to be dispensed or ejected (block 200). The user then selects the desired amount of liquid 104 to be dispensed by compressing the label corresponding to the desired amount of liquid (block 202). For purposes of description and using FIGS. 1 and 5 as an example, the user selects the need for 1.5 ounces of liquid that is housed in chamber 110. Upon fully compressing only label 136 that identifies chamber 110, the pressure within chamber 110 would increase closing off one-way valve 118 (block 204). With the increased pressure within chamber 110, the liquid contents of chamber 110 would be forced into opening 128 of elongated member 126 and the pressurized liquid 104 from the chamber 110 would then emerge from the portion of elongated member 126 at neck portion 106 (block 206). In this manner, a predetermined volume of liquid 104 in the chamber 110 would be discharged at the neck portion 106.

While compressing the chamber 110, liquid 104 from the chamber 110 would not be forced into the chamber 114 because the chamber 114 is already full of liquid 104. Once compression of chamber 110 is released, the properties of the elastic body 102 would cause chamber 110 to return to its prior, undeformed shape and increase in volume thereby drawing in liquid 104 from reservoir 108 through now open one-way valve 118 refilling chamber 110 for use in a subsequent operation (block 208). Elastic body 102 can be composed of plastic, rubber, or other elastic materials that behave as described.

The elastic body 102 is configured to expel liquid 104 from the chambers 110-116. This can include expelling liquid 104 from just one of the chambers 110-116, or concurrently from two or more of the chambers.

In one method, just a single one of the chambers 110-116 is compressed to dispel just the corresponding amount of liquid 104. For example, while fully compressing only label 140, the pressure within the corresponding chamber 114 would increase closing off one-way valve 122. With the increased pressure within chamber 114, the liquid 104 of chamber 114 is forced into opening 132 and then emerge from the portion of elongated member 126 at neck portion 106. In this manner, the predetermined volume of liquid 104 in the chamber 114 would be discharged at the neck portion 106. Liquid 104 from the chamber 114 would not be forced into chamber 110 because one-way valve 122 will have closed when the chamber 114 is experiencing increased pressure.

Once compression of chamber 114 is released, the properties of elastic body 102 would cause chamber 114 to return towards its prior, undeformed shape and increase in volume thereby drawing in liquid from chamber 110. Concurrently, chamber 110 would draw in liquid from reservoir 108 filling chamber 110 through one-way valve 118. In this manner, chamber 110 and chamber 114 are arranged in a decreasing volume in a direction away from reservoir 108. This can be preferable because the compressing of chamber 114 would have higher fluidic resistance when pushing the liquid 104 of chamber 114 into opening 132 when pushing against the higher volume of chamber 110 and one-way valve 118 instead of vice versa.

Compressing of individual chambers 110-116 may be accomplished substantially independently or concurrently to dispense a predetermined amount of liquid. As an example, at the start of such a concurrent operation, each of the chambers will be filled with liquid. Concurrently pressing label 136 corresponding to chamber 110 and pressing label 140 corresponding to chamber 114, where chambers 110 and 114 are adjacent to each other, would dispense the sum of the labeled amount of liquid for each chamber (e.g. 1.50 oz plus 0.75 oz for a total of 2.25 oz liquid dispensed). In this concurrent operation of adjacent chambers, both one-way valves 118 and 122 may be closed in response to compression of chambers 110 and 114, respectively. However, even if the pressure within chamber 110 was higher than chamber 114, and one-way valve 122 remains open, the liquid transferred from chamber 110 to chamber 114 due to the higher pressure in chamber 110 relative to chamber 114 would eventually be dispensed through conducting member 126 if both chambers are fully compressed completely without interruption. Non-adjacent chambers compressed concurrently would operate independently.

The chambers 110-116 should be of unequal volumes. Also, it is a benefit for a user to determine by feel (e.g. without looking) which is the selected volume chamber 110-116 based on the position of the chamber in reference to the neck portion 106 of body 102 compared with the distal end 101 of elastic body 102 away from the neck portion 106, or to determine by feel which is the selected volume chamber based on the tactile aspects of the label associated with the selected volume chamber. For example, when the chambers 110-116 are of different volumes, chamber 110 could contain 1.5 fluid ounces (e.g. 1.50 oz) of liquid, chamber 112 could contain 1.0 ounce (e.g. 1.00 oz) of liquid, chamber 114 could contain 0.75 ounces of liquid, and chamber 116 could contain 0.5 ounces (e.g. 0.50 oz) of liquid. The precision of dispensing volume can be shown on the label or known to the provider or user based on the precision of the smallest volume shown on body 102. Of course, precise metric quantities could also be used. For example, chamber 110 could include 50 milliliters (mL) ounces of liquid, chamber 112 could include 29 mL, chamber 114 could include 22 mL, and chamber 116 could include 15 mL. Different volumes, both British and Metric units, could be used for each of the chambers. It is not necessary that the adjacent volumes have any step-wise or other relationship to each other, although for efficiency a decreasing volume is preferred.

Even though FIG. 2 illustrates an example of liquid dispensing apparatus 100 with an elastic body 102 including reservoir 108 and four chambers 110-116, it is possible to have more or fewer chambers. FIG. 7 includes a dispensing apparatus 100 with a single chamber 110. The elongated member 126 includes one opening 128 at the chamber 110. The apparatus 100 is configured to repeatedly dispense only one volume of liquid when the chamber 110 is compressed. Liquid from the reservoir 108 would move through one-way valve 118 and refill the chamber 110 when the compressive force is removed. As described with reference to FIG. 3, the single chamber 110 of FIG. 7 can be centrally-disposed with conducting member 126 having either an opening 128 or a distal end of conducting member 126 being spaced apart from the closed end of body 102 and open to receiving liquid from the centrally-disposed chamber under pressure.

In other examples, the apparatus 100 includes more than the four dispensing chambers 110-116 as illustrated in FIGS. 2 and 5. Another two or three chambers (not illustrated) could be added above chambers 110-112 in a staggered manner as shown, to provide additional flexibility in dispensing a greater number of precise liquid quantities. Even though the boundaries between adjacent chambers are depicted in a substantially parallel manner, other boundary shapes may be used such as curved shapes where the boundaries intersect the corners of adjacent chambers.

In a multi-chamber example, two or more of the chambers can be the same size and dispense the same amount of liquid 104. This could occur for various reasons such as one amount of liquid 104 has been determined to be dispensed at a greater frequency than other amounts. For example, when dispensing medicine, an amount for a full adult dose may be dispensed at a greater frequency than a child dose or a junior adult dose.

In the various examples, the different chambers can include different shapes or can include different characters to more easily identify the different volumes. This could be particularly useful when used in a dark environment, or in an environment in which the user it not able to see the indicia (e.g., user is required to reach into a small space). In these examples, the corresponding labels identifying the chambers could also include different sizes to more readily identify the amount of liquid.

In another example as illustrated in FIG. 8, the plurality of adjacent chambers 110-116 can be arranged on a same side of the elongated conducting member 126. Each chamber 110-116 includes an opening 128-134 to move the liquid into the elongated conducting member 126, and a one-way valve 118-124 to refill the liquid. In this example, the elongated conducting member 126 can be disposed on one side of the interior space 103.

One-way valves 118-124 can be of any suitable design to promote liquid flow in one direction, but not in the opposite direction. As described, when the one-way valve 118 is open, liquid 104 can flow from reservoir 108 into chamber 110, but cannot substantially flow from chamber 110 into reservoir 108. Likewise, liquid from reservoir 108 can flow from reservoir 108 into chamber 112, but cannot substantially flow from chamber 112 into reservoir 108. In the same manner, liquid can flow from chamber 112 into chamber 116 but cannot flow from chamber 116 into chamber 112.

As shown in FIGS. 9A-9B, one example of a suitable, pressure operated, one-way valve is a so-called "duckbill" valve that permits the flow of liquid 104 under a pressure differential in one direction (OPEN as shown in FIG. 9A), but the valve membrane will collapse when pressure differential is reversed and the one-way valve closes (CLOSED as shown in FIG. 9B). Using one-way valve 118 as an example, higher pressure on a first side 302 compared with a second side 304 causes the valve 118 to open and permit liquid flow. Conversely, lower pressure on first side 302 and equal or higher pressure on second side 304 prevents liquid flow through valve 118.

Similarly, FIGS. 10A-10B illustrates a "flap" valve that permits liquid flow under a pressure differential in one direction (OPEN as shown in FIG. 10A), but the valve membrane will collapse when pressure differential is reversed (CLOSED as shown in FIG. 10B). Again using one-way valve 118 as an example, higher pressure on a first side 402 compared with a second side 404 causes the valve 118 to open and permit liquid flow. Conversely, lower pressure on first side 402 and equal or higher pressure on second side 404 prevents liquid flow through valve 118.

FIGS. 9A-9B and 10A-10B discloses specific examples of valves used for providing the flow of liquid 104. Other types of pressure-operated valves may be used.

As described above, the dispensing apparatus 100 can be used to dispense a predetermined amount of fluid from a selected chamber. The dispensing apparatus 100 also provides for a user to concurrently dispense liquid from two of more chambers. This provides for additional predetermined amounts of liquid to be dispensed. Using FIG. 2 as an example, chamber 110 (with corresponding 1.5 ounces of liquid) and chamber 114 (with corresponding 0.75 ounces of liquid) could be concurrently dispensed to dispel 2.25 ounces of fluid. This requires the user to applying compressive forces concurrently to these two chambers. The ability to concurrently dispense fluid from two or more chambers provides for dispensing additional predetermined amounts of liquid.

In one example, the dispensing apparatus 100 includes chambers with different volumes sized according to the principle of the binary power of two $2^n$ where n=0 to x. The different volumes provide for dispensing a wide variety of volumes of the liquid. For example, a dispensing apparatus 100 can include five chambers each configured to contain a different volume of liquid. A first chamber contains a volume of 16 units ($2^4$=16). A second chamber contains a volume of 8 units ($2^3$=8). A third chamber contains a volume of 4 units ($2^2$=4). A fourth chamber holds a volume of 2 units ($2^1$=2). A fifth chamber holds a volume of 1 unit ($2^0$=1). Thus, with the five chambers, a user is able to dispense various volumes of liquid between 1 unit and 31 units. For example, delivery of 17 units can be dispensed by compressing the first and fifth chambers (i.e., 16+1). Delivery of 5 units can be dispensed by compressing the third and fifth chambers (i.e., 4+1). The number of chambers with different volumes with the binary power of two can vary depending upon the range of the amount of liquid that is to be dispensed.

Figure 11:
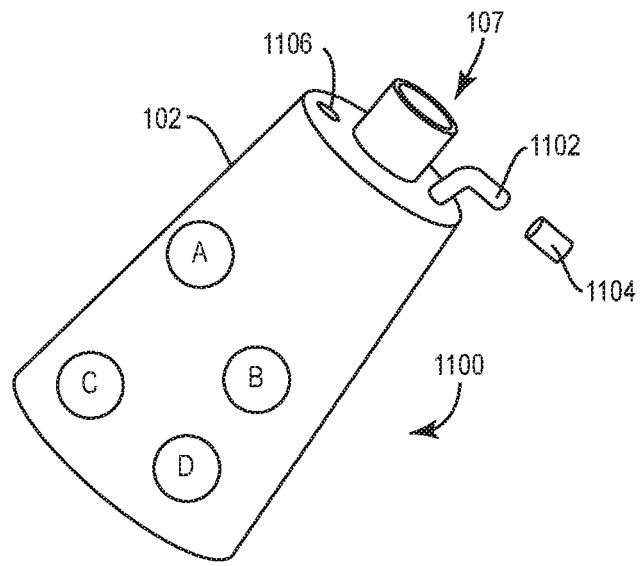
FIG. 11 is a perspective view of a selectable volume precision liquid dispensing apparatus in accordance with an example.

FIG. 11 is a perspective view of a selectable volume precision liquid dispensing apparatus 1100. According to an example, FIG. 11 illustrates a dispensing apparatus 1100 that includes an elastic body 102 that extends around an interior space to contain a liquid, a dispensing port 1102, a removable cap 1104 for the dispensing port 1102, and a one-way air valve 1106 for allowing air to enter body 102 when port 107 is closed. The position of dispensing port 1102 relative to one-way air valve 1106 and the position of various labels (e.g. A-D) may be changed (e.g. swapped) to enable right and/or left-handed operation. In operation, compressing a label 136-142 of the elastic body 102 corresponding to a particular chamber 110-116 causes an increase in pressure within the selected chamber 110-116 as described above. The pressure closes the corresponding one-way valve 118-124 of the selected chamber 110-116 forcing a predetermined volume of the liquid 104 from the selected chamber 110-116 into the corresponding opening of the elongated conducting member 126 and discharging the predetermined volume of liquid from the elastic body 102 through the conducting member 126 and out the dispensing port 1102. Subsequent to the pressing (e.g. compressing) operation, and upon releasing compression of the selected portion, the elastic body 102 causes the previously selected portion 136-142 (e.g. chamber) to expand and refill with liquid 104 directly or indirectly from the reservoir 108 and/or an adjacent chamber as described above. When port 107 is closed, air may enter body 102 through one-way air valve 1106 during the refilling operation.

Figure 12:
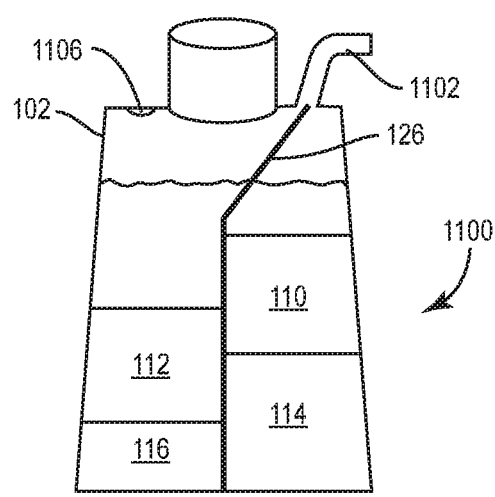
FIG. 12 is a schematic section view of a selectable volume precision liquid dispensing apparatus in accordance with an example.

FIG. 12 is a schematic section view of a selectable volume precision liquid dispensing apparatus 1100. In this example, the dispensing apparatus 1100 is tilted to enable the dispensing port 1102 to be in close proximity to a dispensing location during operation of the dispensing apparatus. Elongated conducting member 126 receives the dispensed liquid from the selected dispensing chamber and conducts the liquid to the dispensing port 1102. Note the end of elongated tube 126 is not disposed in the neck portion 106 of port 107, as shown in reference to FIG. 1 and example dispensing apparatus 100.

Figure 13:
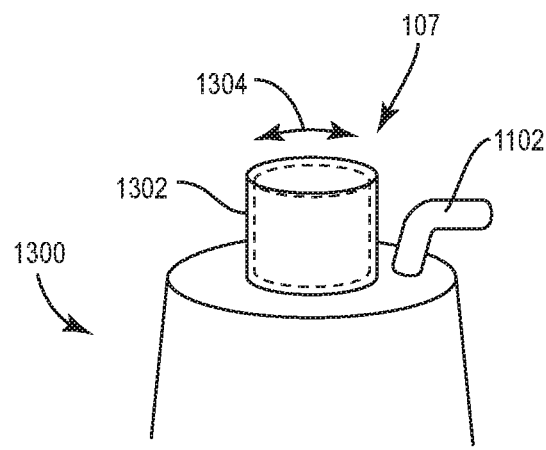
FIGS. 13, 13A, and 13B are a close-up view of a ventilation cap attached to a selectable volume precision liquid dispensing apparatus in accordance with an example.
Figure 13A:
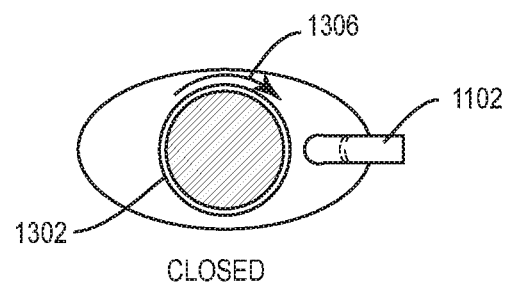
Figure 13B:
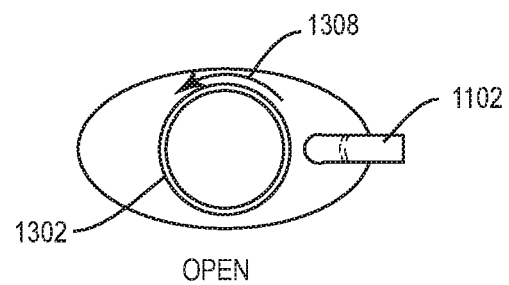

FIGS. 13, 13A, and 13B are a close-up view of a ventilation cap 1302 attached to a selectable volume precision liquid dispensing apparatus 1300. In this example, the ventilation cap 1302 is operable in a turning (e.g. twisting or rotating) manner 1304 to selectively open and close depending on the turning direction. When turning in a first direction 1306, for example, port 107 may be closed tightly to prevent liquid leaking out from port 107 and creating a vacuum to prevent liquid leaking out from dispensing port 1102 when not in operation. The ventilation cap 1302 is also operable to open partially to allow air to flow in (e.g. during re-filling of the chambers (110-116)) after release of compression. This partial opening can be configured based on a reverse turning in direction 1308 (e.g. opposite to direction 1306), to at least partially open and allow air flow into port 107. Cap 1302 may include a screen with holes large enough to allow air flow in, but small enough to inhibit liquid flow due to surface tension of the liquid. Alternatively, cap 1302 may include a compression seal that closes when cap 1302 is turned in a first direction (e.g. 1306) and opens when turned in a second direction (e.g. 1308).

Figure 14:
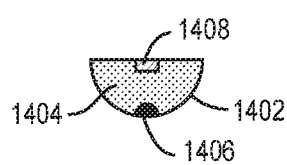
FIGS. 14 and 14A are a side view of a filter cup for use with a liquid dispensing apparatus in accordance with an example.
Figure 14A:
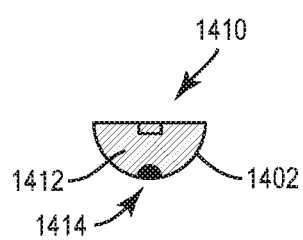

FIGS. 14 and 14A are a side view of a rounded filter cup 1402 for use with either liquid dispensing apparatus 100, 1100, or 1300. Filter cup 1402 includes a plurality of holes or slots 1404 to permit liquid flow through filter cup 1402 to allow refilling of body 102 with liquid. Filter cup 1402 may also include a solid portion 1406 (e.g. not holes or slots) and a handle portion 1408 for gripping, installing, and/or removing filter cup 1402 during installation in or removal from port 107. A filter cup assembly 1410 may include a flexible membrane 1412 stretched over an underside portion of filter cup 1402 and having a hole region 1414 in the membrane 1412 to permit air flow through filter cup 1402 (into interior space 103) when releasing compression of the selected chamber 110-116 or to permit liquid flow through filter cup 1402 when filling body 102 with liquid. The size of hole region 1414 is slightly smaller than the size of solid portion 1406 so filter cup assembly allows flow into neck region 106 and not out of neck region 106. In this manner, filter cup assembly 1410 may act as a one-way valve to permit air/liquid to flow into body 102, but preventing leakage of liquid during operation or inversion of dispensing apparatus 100, 1100, or 1300. Depending on the properties of the holes or slots 1404 and membrane 1412, it may be necessary to fill body 102 with liquid under pressure.

Figure 15:
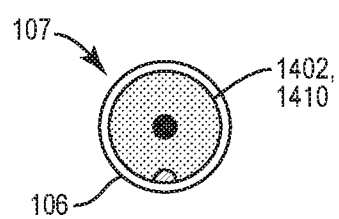
FIGS. 15 and 15A are top view of a filter cup for use with a liquid dispensing apparatus in accordance with an example.
Figure 15A:
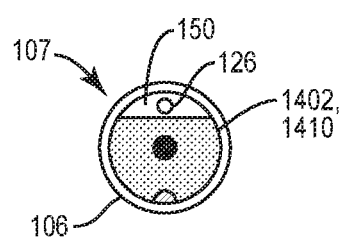

FIGS. 15 and 15A are top view of a filter cup for use with a liquid dispensing apparatus. As illustrated, filter cup 1402 or filter cup assembly 1410 may be removably inserted into port 107. According to the dispensing apparatus 100 shown in FIG. 1, elongated tube 126 extends to the top edge of port 107 to ensure the liquid may be dispensed without falling back into port 107. In this manner, filter cup 1402 or filter cup assembly 1410 can have a chord region to mate with retaining member 150. As illustrated, the chord region traverses a portion of the opening in neck portion 106 or port 107. In one example, the retaining member 150 remains in the neck portion 106 during filling and is not integrated with filter cup 1402 or filter cup assembly 1410. In another example, the retaining member 150 forms part of filter cup 1402 or filter cup assembly 1410, so that filter cup 1402 or filter cup assembly 1410 is fitted over an end portion of elongated tube 126 after filling reservoir 108.

The elastic body 102 can be constructed from a variety of materials that provide for the desired movement to expel the liquid when a force is applied and return towards the original position when the force is removed to refill the liquid. Examples of materials include but are not limited to plastic and rubber.

The present invention may be carried out in other ways than those specifically set forth herein without departing from essential characteristics of the invention. The present examples and embodiments are to be considered in all respects as illustrative and not restrictive, and all changes coming within the meaning and equivalency range of the appended claims are intended to be embraced therein.

What is claimed is:

1. A liquid dispensing apparatus, comprising:
   an elastic body to retain and discharge a liquid, the elastic body comprising a port to discharge the liquid;
   an interior space formed within the elastic body, the interior space comprising a reservoir in serial communication with a plurality of chambers;
   a one-way valve associated with each of the chambers to conduct the liquid into the associated chamber; and
   an elongated conducting member disposed within the interior space and terminating at the port, the elongated conducting member comprising a plurality of openings, each opening corresponding to one of the plurality of chambers;
   wherein compressing a selected portion of the elastic body corresponding to a particular one of the chambers causes an increase in pressure within the selected chamber to close the corresponding one-way valve of the selected chamber forcing a predetermined volume of the liquid from the selected chamber into the corresponding opening of the elongated conducting member and discharging the predetermined volume of the liquid from the particular one of the chambers through the port.

2. The apparatus of claim 1, wherein the elastic body is configured to return towards an original shape after releasing the compression of the selected portion and cause the selected chamber to expand and refill with the liquid from one of the reservoir and an adjacent chamber through the associated one-way valve.

3. The apparatus of claim 1, wherein each of the plurality of chambers are of different volumes.

4. The apparatus of claim 3, wherein each of the plurality of chambers has a volume that is a binary power of two.

5. The apparatus of claim 4, wherein the plurality of chambers are disposed in decreasing volume in a direction away from the reservoir.

6. The apparatus of claim 5, wherein the plurality of chambers are arranged on a same side of the elongated conducting member.

7. The apparatus of claim 5, wherein the plurality of chambers are arranged in a staggered arrangement on opposite sides of the elongated conducting member.

8. The apparatus of claim 1, wherein the one-way valves are one of duckbill valves and flap-operated valves.

9. The apparatus of claim 1, further comprising a plurality of labels positioned on an exterior of the elastic body, each of the labels being aligned within one of the plurality of chambers and include identification indicia indicating a volume of the associated chamber.

10. The apparatus of claim 9, wherein the identification indicia of one or more of the labels comprises a raised portion with a volume characteristic that provides tactile feedback when compressed.

11. The apparatus of claim 1, further comprising a filter cup disposed adjacent to a neck portion in the port, the filter cup configured to permit at least one of air and the liquid to flow into the body when the elastic body returns toward the original shape after releasing the compression of the selection portion.

12. The apparatus of claim 1, further comprising a cap for removably sealing the port.

13. A liquid dispensing apparatus, comprising:
   an elastic body to retain and discharge a liquid, the elastic body comprising an interior space and a port in communication with the interior space;
   an elongated conducting member disposed within the interior space and configured to deliver the liquid to the port, the elongated conducting member comprising spaced-apart openings that are spaced away from the port; and
   one or more chambers positioned within the interior space, each of the one or more chambers being aligned with a different one of the openings in the elongated conducting member and comprising:
     an enclosed area to contain a predetermined amount of the liquid; and
     a one-way valve to conduct the liquid into each of the one or more chambers;
   wherein each of the one or more chambers is configured to be compressed to expel the liquid in the chamber into the elongated conducting member for delivery from the elastic body through the port.

14. The apparatus of claim 13, further comprising a reservoir in the interior space to supply the liquid to each of the chambers through the respective one-way valves.

15. The apparatus of claim 14, wherein the reservoir is isolated from the elongated conducting member and is larger than any of the chambers to contain a greater amount of the liquid than any of the chambers.

16. The apparatus of claim 13, wherein the one or more chambers:

are disposed in decreasing volume in a direction away from the port; and comprise a volume that is a binary power of two.

17. A method of dispensing a liquid from an apparatus, the method comprising:

compressing a selected portion of an elastic body corresponding to a chamber and thereby increasing a pressure within the chamber;

closing a one-way valve in the chamber in response to increasing the pressure in the chamber, the one-way value fluidly connects the chamber to a reservoir;

forcing a predetermined volume of the liquid from the chamber and into an elongated conducting member and moving the liquid along the elongated conducting member and discharging the predetermined volume of the liquid from a port in the elastic body;

releasing the selected portion of the elastic body thereby decreasing the pressure within the chamber; and moving the liquid from the reservoir through the one-way valve and refilling the liquid in the chamber in response to decreasing the pressure.

18. The method of claim 17, further comprising moving the liquid from the reservoir and through one or more of the other chambers prior to moving the liquid through the one-way valve and refilling the chamber.

19. The method of claim 17, wherein the chamber is a first one of a plurality of chambers within an interior space, the method further comprising:

compressing a second one of the plurality of chambers and thereby increasing a pressure within the second chamber;

closing a one-way valve in the second chamber in response to increasing the pressure in the second chamber preventing the liquid from the reservoir from moving into the second chamber;

forcing a predetermined volume of the liquid from the second chamber into the elongated conducting member and discharging the predetermined volume of liquid from the port and out of the elastic body, the predetermined volume of the liquid discharged from the second chamber being different than the predetermined volume of the liquid discharged from the first chamber;

releasing the second one of the plurality of chambers and thereby decreasing the pressure within the second chamber; and opening the one-way valve in the second chamber in response to decreasing the pressure in the second chamber and moving the liquid in the reservoir through the one-way valve and into the second chamber.

20. The method of claim 19, further comprising concurrently compressing the first and second chambers and discharging the liquid from each of the first and second chambers through the port.

* * * * *